(12) United States Patent
Nishida

(10) Patent No.: US 8,062,156 B2
(45) Date of Patent: Nov. 22, 2011

(54) CONTROL DEVICE FOR CONTINUOUSLY VARIABLE TRANSMISSION

(75) Inventor: Masayuki Nishida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 691 days.

(21) Appl. No.: 11/727,744

(22) Filed: Mar. 28, 2007

(65) Prior Publication Data

US 2007/0232424 A1 Oct. 4, 2007

(30) Foreign Application Priority Data

Mar. 29, 2006 (JP) ................. 2006-090311

(51) Int. Cl.
*F16H 61/00* (2006.01)
*F16H 59/00* (2006.01)
(52) U.S. Cl. .......................... 474/28; 474/18
(58) Field of Classification Search ............... 474/8–28; 477/39, 44, 45, 48, 160
See application file for complete search history.

(56) References Cited

U.S. PATENT DOCUMENTS

| | | | |
|---|---|---|---|
| 6,299,564 B1 * | 10/2001 | Gessler et al. ............... | 477/45 |
| 6,338,695 B1 * | 1/2002 | Aoki et al. .................. | 477/160 |
| 6,443,871 B2 | 9/2002 | Taniguchi et al. | |
| 2005/0107195 A1 * | 5/2005 | Katou .......................... | 474/28 |
| 2005/0197221 A1 * | 9/2005 | Nozawa et al. ............. | 474/18 |

FOREIGN PATENT DOCUMENTS

| | | |
|---|---|---|
| JP | 6-42625 | 2/1994 |
| JP | 2001-012598 | 1/2001 |
| JP | 2001-330135 | 11/2001 |

* cited by examiner

*Primary Examiner* — Michael Mansen
*Assistant Examiner* — Robert Reese
(74) *Attorney, Agent, or Firm* — Smith, Gambrell & Russell, LLP

(57) ABSTRACT

Safety as well as the minimum driving performance is secured by preventing abrupt down-shifting if a line pressure valve or a primary pressure control valve fails. A line pressure path connected to an oil pump is connected with a line pressure control valve. A first primary pressure path branched from the line pressure path is connected with a hydraulic fluid chamber through a fail-safe valve, and a secondary pressure path branched from the line pressure path is connected to a hydraulic fluid chamber. The line pressure control valve is connected with a second primary pressure path in communication with a hydraulic fluid chamber, and this secondary primary pressure path is provided with a primary pressure control valve and a limiter valve. When the line pressure control valve and the primary pressure control valve fail and excess line pressure or primary pressure is output, the pressure in the hydraulic fluid chamber is reduced by the fail-safe valve, so that the pressure in the hydraulic fluid chamber is reduced by the limiter valve.

23 Claims, 7 Drawing Sheets

CONTROL DEVICE FOR CONTINUOUSLY VARIABLE TRANSMISSION

CROSS REFERENCE TO RELATED APPLICATIONS

The disclosure of Japanese Application No. 2006-090311 filed on Mar. 29, 2006 including the specification, drawings, and abstract is incorporated herein by reference in its entirety.

BACKGROUND OF THE INVENTION

1. Field of the Invention

The present invention relates to a control device for a continuously variable transmission for use in a vehicle.

2. Description of the Related Art

The continuously variable transmission (CVT) for use in a vehicle includes a primary pulley provided at an input shaft and a secondary pulley provided at an output shaft and controls its speed ratio by changing the winding diameter of a driving belt or the like placed around these pulleys. The primary and secondary pulleys each include a fixed sheave and a movable sheave opposing the fixed sheave. The movable sheave is moved in the axial direction, which allows the pulley groove width to be changed, so that the winding diameter of the driving belt can be controlled.

The continuously variable transmission controls the winding diameter of the driving belt by one of the pulleys (for example the primary pulley) and restrains the slipping of the driving belt by the other pulley (for example the secondary pulley). When the speed ratio is controlled by the primary pulley, a target speed ratio is set by referring to a characteristic map based on the throttle opening degree or the vehicle speed, and the pulley groove width of the primary pulley is controlled according to the target speed ratio. When the slipping of the driving belt is controlled by the secondary pulley, a target clamp force is set based on the target speed ratio and an input torque, so that the pulley groove width of the secondary pulley is controlled according to the target clamp force.

The primary and secondary pulleys have their pulley groove widths controlled in this way, primary pressure regulated through a speed ratio control valve is supplied to the hydraulic fluid chamber of the primary pulley, while line pressure regulated through a line pressure control valve is supplied to the hydraulic fluid chamber of the secondary pulley. The speed ratio control valve or the line pressure control valve regulates the primary pressure or the line pressure in response to a control signal from an electronic control unit, and a hydraulic control circuit has a fail-safe function in order to secure the minimum driving performance as well as the driving safety even when the speed ratio control valve or the line pressure control valve becomes uncontrollable in a failed state. According to a proposed control device, the speed ratio is fixed or controlled to the overdrive side in a failed state, so that abrupt down-shifting is prevented and the safety is secured. This is because when the speed ratio control valve attains a failed state in particular, and the hydraulic fluid is abruptly discharged from the primary pulley, the vehicle can be decelerated by abrupt down-shifting (see for example JP-A-2001-12598).

When the speed ratio control valve attains a failed state and the speed ratio is controlled to the overdrive side, it is difficult to re-start the vehicle after stopping the vehicle. Therefore, according to another proposed control device for a continuously variable transmission, when the speed ratio control valve attains a failed stated, the supply of the hydraulic fluid is controlled through a manual valve in association with selecting operation, so that the speed ratio may be controlled to a low state in order to improve the starting performance (see for example JP-A-6-42625). According to yet another proposed control device, when a large load is applied on the driving belt as the line pressure is set to a high value because of a failed state attained by the line pressure control valve, the speed ratio is approximated to 1.0 to alleviate the load on the driving belt (see for example JP-A-2001-330135).

The continuously variable transmissions disclosed by JP-A-2001-12598 JP-A-6-42625, and JP-A-2001-330135 each include a single cylinder type primary pulley including one hydraulic fluid chamber. However, the primary pulley structure is not limited to such a single cylinder type and a double cylinder type having two hydraulic fluid chambers has been developed. The continuously variable transmission including the double cylinder type primary pulley also needs a fail-safe function in order to secure the minimum necessary driving performance as well as the driving safety. However, it has been extremely difficult to apply the conventional fail-safe function to the transmissions.

SUMMARY OF THE INVENTION

It is an object of the invention to secure the minimum driving performance as well as safety during driving even when the line pressure control valve and the speed ratio control valve attain a failed state in a continuously variable transmission including a pulley having a plurality of hydraulic fluid chambers.

A control device for a continuously variable transmission according to the invention has a variable speed pulley including first and second variable speed pressure chambers that control the groove width of the pulley, a tightening pulley including a tightening pressure chamber that controls the groove width of the pulley, and a power transmission element wound around the variable speed pulley and the tightening pulley, and the control device includes a line pressure control valve provided between a hydraulic pressure supply source and the tightening pulley to regulate line pressure supplied to the first variable speed pressure chamber and the tightening pressure chamber, a speed ratio control valve provided between the line pressure control valve and the variable speed pulley to regulate variable speed control pressure supplied to the second variable speed pressure chamber, a first reducing valve provided between the line pressure control valve and the variable speed pulley to reduce the line pressure when the line pressure exceeds first limit pressure, and a second reducing valve provided between the speed ratio control valve and the variable speed pulley to reduce the variable speed control pressure when the variable speed control pressure exceeds second limit pressure.

In the control device for a continuously variable transmission according to the invention, the first reducing valve is provided between the line pressure control valve and the first variable speed pressure chamber and reduces the line pressure supplied to the first variable speed pressure chamber.

In the control device for a continuously variable transmission according to the invention, the second reducing valve is provided between the speed ratio control valve and the second variable speed pressure chamber and reduces the variable speed control pressure supplied to the second variable speed chamber.

In the control device for a continuously variable transmission according to the invention, the size of the first variable speed pressure chamber relative to the tightening pressure chamber is set based on a shift speed requested upon down-shifting.

In the control device for a continuously variable transmission according to the invention, the sizes of the first and second variable speed pressure chambers relative to the tightening pressure chamber are set based on a shift speed requested upon up-shifting.

In the control device for a continuously variable transmission according to the invention, the first limit pressure is the maximum line pressure regulated by the line pressure control valve.

In the control device for a continuously variable transmission according to the invention, the line pressure control valve and the speed ratio control valve set the second limit pressure based on a target speed ratio when the line pressure control valve and the speed ratio control valve fail.

According to the invention, there are provided the first reducing valve that reduces the line pressure when the line pressure exceeds the first limit pressure and the second reducing valve that reduces the variable speed control pressure when the variable speed control pressure exceeds the second limit pressure. Therefore, if the line pressure control valve and the variable speed control valve fail, the speed ratio can be controlled at a prescribed target speed ratio. In this way, abrupt down-shifting can be prevented and the safety as well as the minimum vehicle performance can be secured.

DETAILED DESCRIPTION OF THE PREFERRED EMBODIMENTS

Now, an embodiment of the invention will be described in detail in conjunction with the accompanying drawings.

Figure 1:
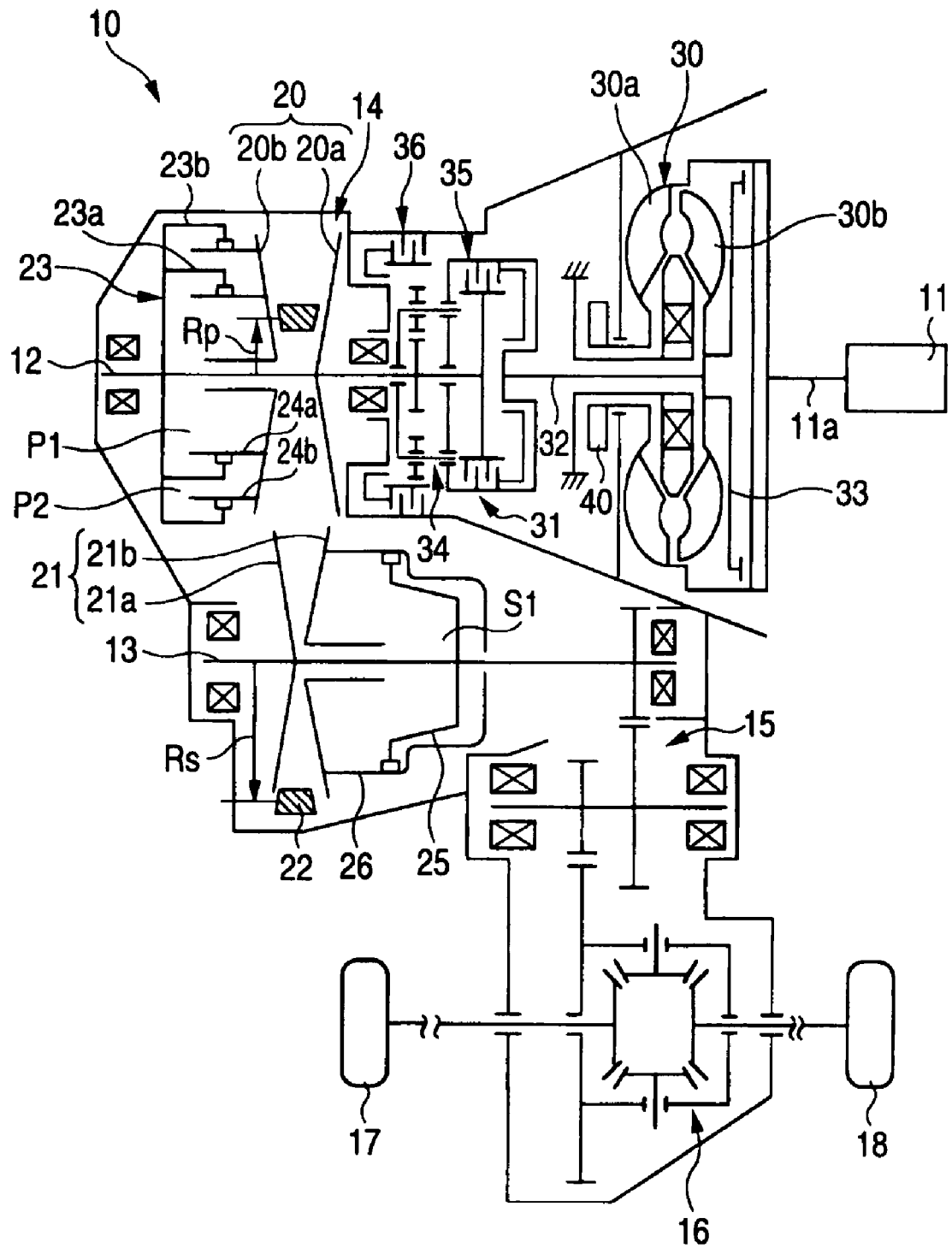
FIG. 1 is a skeleton view of a continuously variable transmission that is controlled by a control device according to one embodiment of the invention.

FIG. 1 is a skeleton view of a continuously variable transmission 10 that is controlled by a control device according to the embodiment of the invention. As shown in FIG. 1, the continuously variable transmission 10 is a belt-driving type continuously variable transmission and has a primary shaft 12 driven by an engine 11 and a secondary shaft 13 parallel to the primary shaft. A transmission mechanism 14 is provided between the primary shaft 12 and the secondary shaft 13, the rotation of the primary shaft 12 is transmitted to the secondary shaft 13 through the transmission mechanism 14, and the rotation of the secondary shaft 13 is transmitted to the left and right driving wheels 17 and 18 through a reduction mechanism 15 and a differential mechanism 16.

A primary pulley 20 as a variable speed pulley is provided at the primary shaft 12, and the primary pulley 20 includes a fixed sheave 20a integral with the primary shaft 12 and a movable sheave 20b opposing the fixed sheave and axially slidable with respect to the primary shaft 12. A secondary pulley 21 as a tightening pulley is provided at the secondary shaft 13, and the secondary pulley 21 has a fixed sheave 21a integral with the secondary shaft 13 and a movable sheave 21b opposing the fixed sheave and axially slidable with respect to the secondary shaft 13. A driving belt 22 as a power transmission element is wrapped around the primary pulley 20 and the secondary pulley 21, and the pulley groove widths of the primary pulley 20 and the secondary pulley 21 are varied to allow the winding diameter of the driving belt 22 to vary continuously. Note that when Rp represents the winding diameter of the driving belt 22 around the primary pulley 20 and Rs represents the winding diameter around the secondary pulley 21, the speed ratio of the continuously variable transmission 10 is obtained as Rs/Rp.

In order to change the pulley groove width of the primary pulley 20, a cylinder 23 having two drum portions 23a and 23b is fixed to the primary shaft 12, and two sleeve portions 24a and 24b slidably in contact with the inner circumferential surfaces of the drum portions 23a and 23b are fixed to the movable sheave 20b. A hydraulic fluid chamber P1 serving as a first transmission pressure chamber and a hydraulic fluid chamber P2 serving as a second transmission pressure chamber are separated by the cylinder 23 at the backside of the movable sheave 20b. In order to change the pulley groove width of the secondary pulley 21, a disk-shaped pressure support member 25 is fixed at the secondary shaft 13, while a cylinder 26 slidably in contact with the outer circumferential surface of the pressure support member 25 is fixed at the movable sheave 21b. A hydraulic fluid chamber S1 serving as a tightening pressure chamber is defined by the cylinder 26 at the backside of the movable sheave 21b. The pulley groove widths are controlled by regulating the hydraulic pressure supplied to the hydraulic fluid chambers P1 and P2 on the primary side and the hydraulic pressure supplied to the hydraulic fluid chamber S1 on the secondary side.

In order to transmit engine power to the primary pulley 20, a torque converter 30 and a forward/reverse switching mechanism 31 are provided between the crankshaft 11a and the primary shaft 12. The torque converter 30 includes a pump shell 30a coupled to the crankshaft 11a and a turbine runner 30b opposing thereto, and the turbine runner 30b is coupled with a turbine shaft 32. A lockup clutch 33 to engage the crankshaft 11a and turbine shaft 32 depending on the driving state is incorporated in the torque converter 30.

The forward/reverse switching mechanism 31 includes a double-pinion type planetary gear train 34, a forward clutch 35, and a reverse brake 36, and the power transmission path can be switched by operating the forward clutch 35 or the reverse brake 36. When the forward clutch 35 and the reverse brake 36 are both released, the turbine shaft 32 and the primary shaft 12 are separated from each other and the forward/reverse switching mechanism 31 is switched to the neutral state in which power is not transmitted to the primary shaft 12. When the reverse brake 36 is released and the forward clutch 35 is engaged, the rotation of the turbine shaft 32 is directly transmitted to the primary pulley 20, while when the forward clutch 35 is disengaged and the reverse brake 36 is applied, the rotation of the turbine shaft 32 is reversed and the reversed rotation is transmitted to the primary pulley 20.

Figure 2:
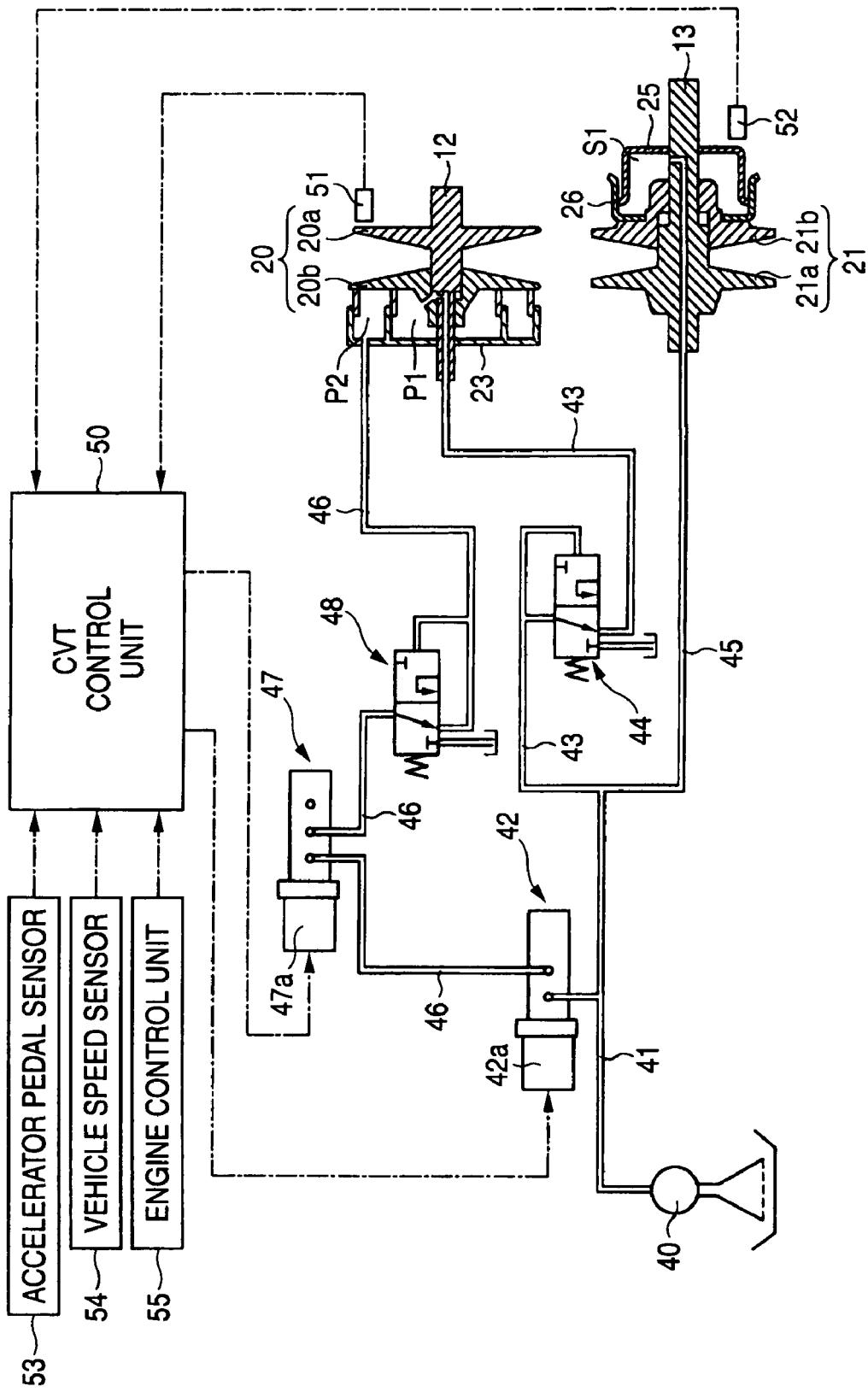
FIG. 2 schematically shows a hydraulic control system and an electronic control system for the continuously variable transmission.

FIG. 2 is a schematic diagram of the hydraulic control system and the electronic control system of the continuously variable transmission 10. As shown in FIG. 2, in order to supply the hydraulic fluid to the primary pulley 20 or the secondary pulley 21, the continuously variable transmission 10 is provided with an oil pump 40 as a hydraulic supply source driven by the engine. A line pressure path 41 connected to the outlet of the oil pump 40 is connected with a line pressure control valve 42, and the line pressure control valve 42 regulates line pressure PL as the basic hydraulic pressure for the hydraulic control circuit. The line pressure path 41 branches and a first primary pressure path 43 that extends toward the primary pulley 20 is connected to the hydraulic fluid chamber P1 of the primary pulley 20 through a failsafe valve 44 as a first reducing valve and a secondary pressure path 45 that extends toward the secondary pulley 21 is connected to the hydraulic fluid chamber S1 of the secondary pulley 21. The line pressure control valve 42 is connected with a second primary pressure path 46 in communication with the hydraulic fluid chamber P2 of the primary pulley 20, and the second primary pressure path 46 is provided with a primary pressure control valve 47 as a speed ratio control valve that regulates primary pressure Pp as transmission control pressure and a limiter valve 48 as a second reducing valve that controls the upper pressure limit for the primary pressure Pp.

More specifically, the line pressure PL regulated by the line pressure control valve 42 is supplied to the hydraulic fluid chamber P1 on the primary side, and the primary pressure Pp regulated by the primary pressure control valve 47 is supplied to the hydraulic fluid chamber P2 on the primary side. Therefore, a clamp force Fp produced by the following Expression (1) is generated at the primary pulley 20. The line pressure PL regulated by the line pressure control valve 42 is supplied to the hydraulic fluid chamber. S1 on the secondary side and therefore a clamp force Fs produced by the following Expression (2) is generated at the secondary pulley 21. The magnitudes of clamp forces Fp and Fs can be controlled to change the winding diameter of the driving belt 22 so that the speed ratio can be controlled. Note that AP1 represents the area of the hydraulic fluid chamber P1 that receives the pressure, AP2 represents the area of the hydraulic fluid chamber P2 that receives the pressure, and AS represents the area of the hydraulic fluid chamber S1 that receives the pressure.

$$Fp = AP1 \times PL + AP2 \times Pp \quad (1)$$

$$Fs = AS \times PL \quad (2)$$

The line pressure control valve 42 and the primary pressure control valve 47 are electromagnetic flow control valves including solenoid portions 42a and 47a, and the solenoid portions 42a and 47a are supplied with driving current from the CVT control unit 50. The CVT control unit 50 includes a microprocessor (CPU) that is not shown and the CPU is connected with a ROM, a RAM, and an I/O port through a bus line. The ROM stores a control program and various kinds of map data, and the RAM temporarily stores data after operation by the CPU. The CPU is provided with detection signals indicating the travel state of the vehicle from various kinds of sensors through the I/O port.

The various kinds of sensors that input detection signals to the CVT control unit 50 are for example a primary rotation number sensor 51 that detects the primary rotation number of the primary pulley 20, a secondary rotation number sensor 52 that detects the secondary rotation number of the secondary pulley 21, an accelerator pedal sensor 53 that detects the depression amount of the accelerator pedal, and a vehicle speed sensor 54 that detects the speed of the vehicle. The CVT control unit 50 is connected with an engine control unit 55 and receives engine control information such as the throttle opening degree and the engine revolution number from the engine control unit 55.

Figure 3:
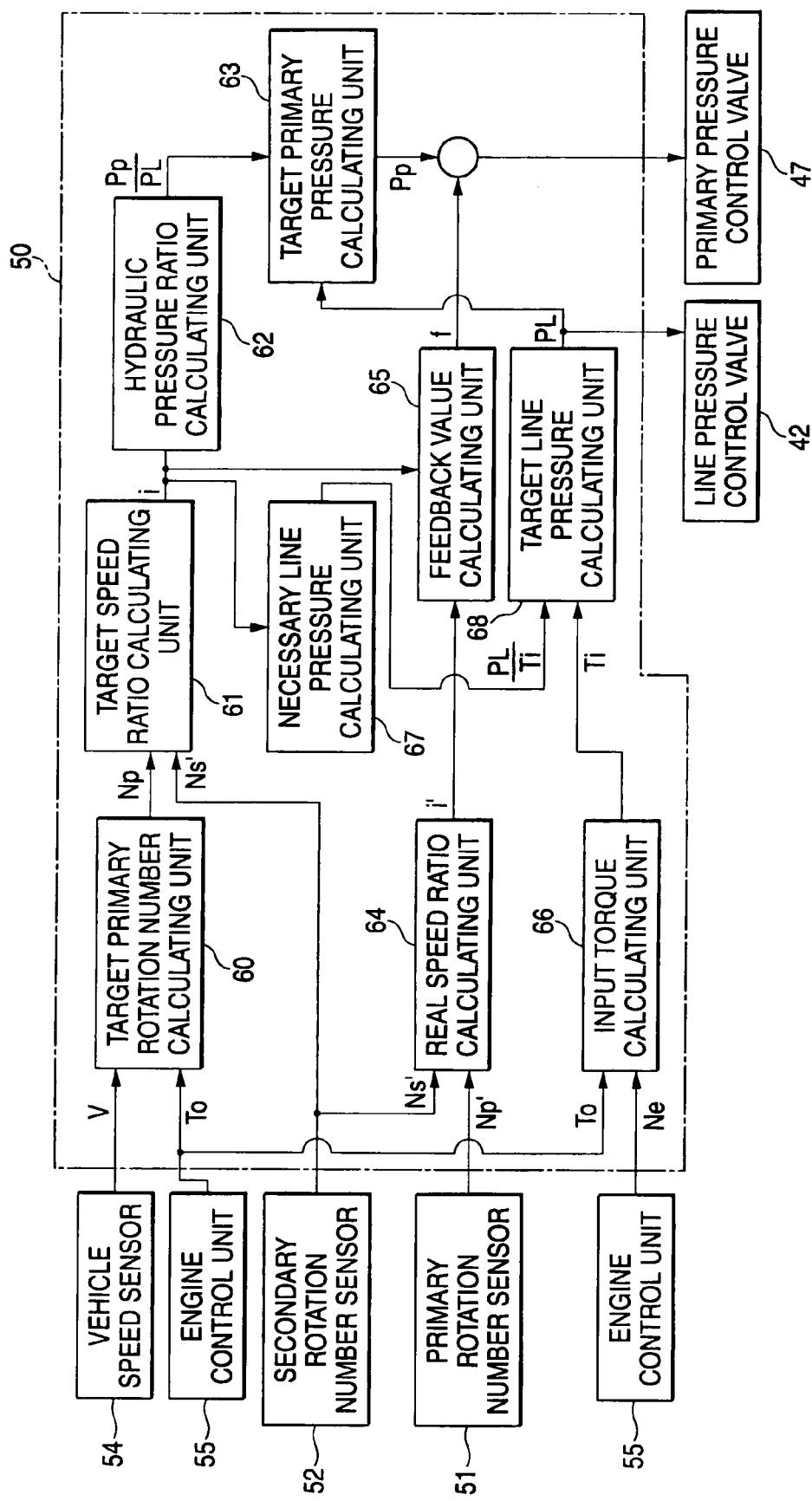
FIG. 3 is a block diagram of a transmission control system for a CVT control unit.

Now, the process of calculating target primary pressure Pp and setting driving current to the primary pressure control valve 47 and the process of calculating target line pressure PL and setting driving current to the line pressure control valve 42 will be described. FIG. 3 is a block diagram of a transmission control system in the CVT control unit 50.

As shown in FIG. 3, in order to set the target primary pressure Pp, a target primary rotation number calculating unit 60 calculates a target primary rotation number Np by referring to a prescribed speed shift map based on a vehicle speed V and a throttle opening degree To, a target speed ratio calculating unit 61 calculates a target speed ratio i based on the target primary rotation number Np and a real secondary rotation number Ns'. A hydraulic pressure ratio calculating unit 62 calculates the hydraulic ratio (Pp/PL) between the target primary pressure Pp and the target line pressure PL corresponding to the target speed ratio i. A target primary pressure calculating unit 63 calculates the target primary pressure Pp by multiplying the hydraulic ratio by the target line pressure PL. The real speed ratio calculating unit 64 calculates a real speed ratio i' based on a real primary rotation number Np' and a real secondary rotation number Ns', a feedback value calculating unit 65 calculates a feedback value f based on the real speed ratio i' and the target speed ratio i. The CVT control unit 50 sets driving current based on the feedback-controlled target primary pressure Pp and then outputs the driving current to the primary pressure control valve 47, so that the clamp force Fp of the primary pulley 20 is controlled to achieve the target speed ratio i.

In order to calculate the target line pressure PL, an input torque calculating unit 66 calculates an engine torque based on the engine revolution number Ne and the throttle opening degree To and then adds an amplified torque from the torque converter 30 to the engine torque to calculate an input torque Ti input to the primary pulley 20. A necessary line pressure calculating unit 67 refers to a prescribed characteristic map based on the target speed ratio i and calculates necessary line pressure (PL/Ti) per unit torque. A target line pressure calculating unit 68 multiplies the target line pressure (PL/Ti) per unit torque by the input torque Ti to produce the target line pressure PL to be supplied to the secondary pulley 21. Then, the CVT control unit 50 sets driving current based on the target line pressure PL and then outputs the driving current to the line pressure control valve 42, so that the secondary pulley 21 is allowed to carry out tightening operation with an appropriate clamp force Fs and the slipping of the driving belt 22 can be reduced.

Figure 4:
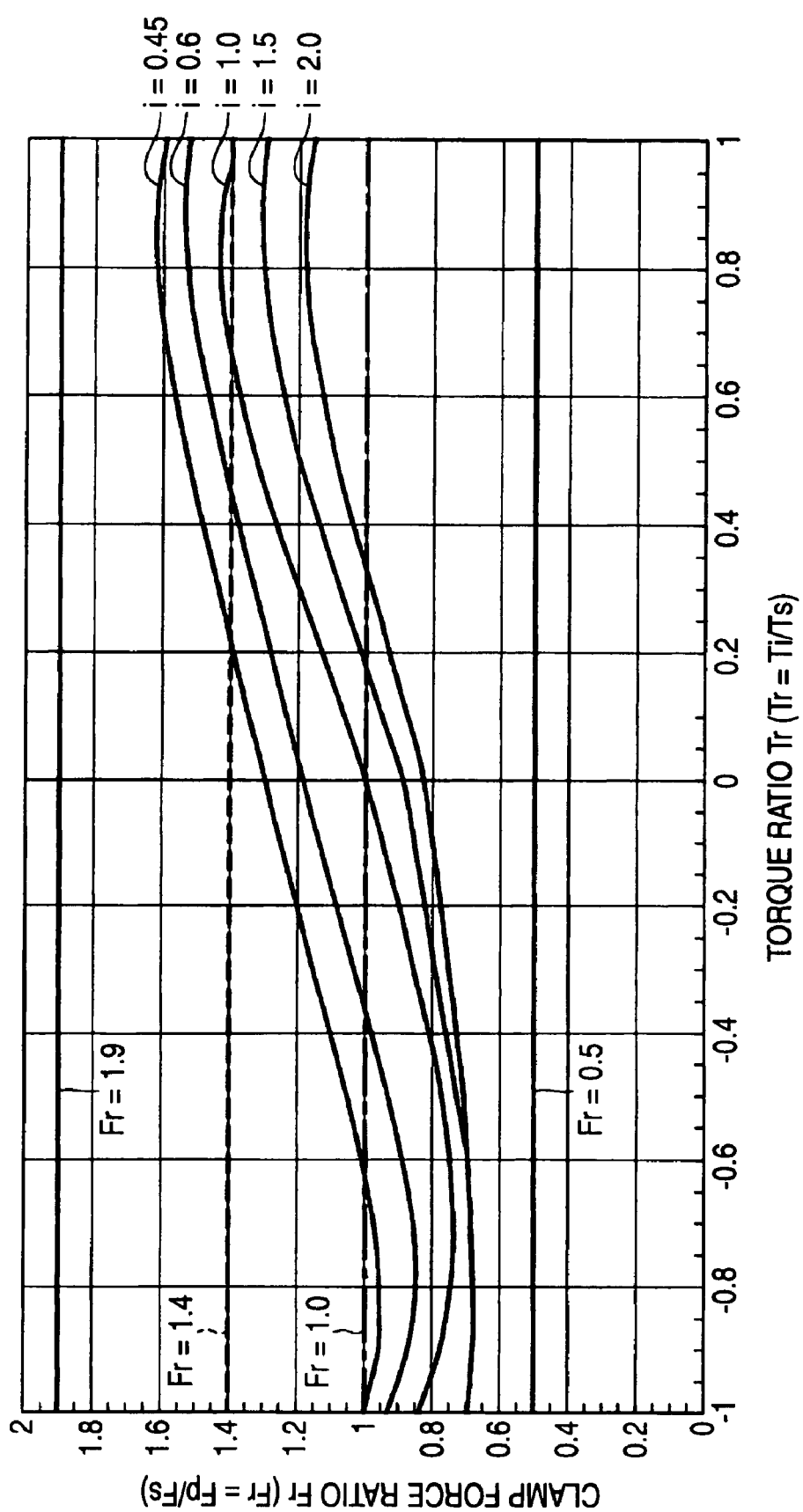
FIG. 4 is a characteristic line graph representing the relation between a speed ratio, a clamp force ratio, and a torque ratio.

Now, the speed ratio characteristic of the continuously variable transmission 10 will be described and the state of how hydraulic pressure is supplied when the variable speed control is carried out will be described. FIG. 4 is a characteristic line graph representing the relation among the speed ratio i, the clamp force ratio Fr and the torque ratio Tr. Note that the clamp force ratio Fr refers to the ratio of the clamp force Fp relative to the clamp force Fs (Fp/Fs), and the torque ratio Tr is the ratio of the input torque Ti relative to the slip torque Ts (Ti/Ts). The slip torque Ts is a limit torque at which slipping is caused at the driving belt 22.

As shown in FIG. 4, the speed ratio i of the continuously variable transmission 10 changes with both the clamp force ratio Fr and the torque ratio Tr. Assuming that the torque ratio Tr is kept constant and the clamp force ratio Fr is raised, the speed ratio i is lowered to the overdrive side and if the clamp force ratio Fr is lowered, the speed ratio i is raised to the low side. For example, assuming that the clamp force ratio Fr is kept constant and the torque ratio Tr is raised, the speed ratio i is raised to the low side and if the torque ratio Tr is lowered, the speed ratio i is lowered to the overdrive side. If the input torque Ti is an acceleration torque, the torque ratio Tr is represented as a positive value, and if the input torque Ti is a deceleration torque, the torque ratio Tr is represented as a negative value.

Figure 5:
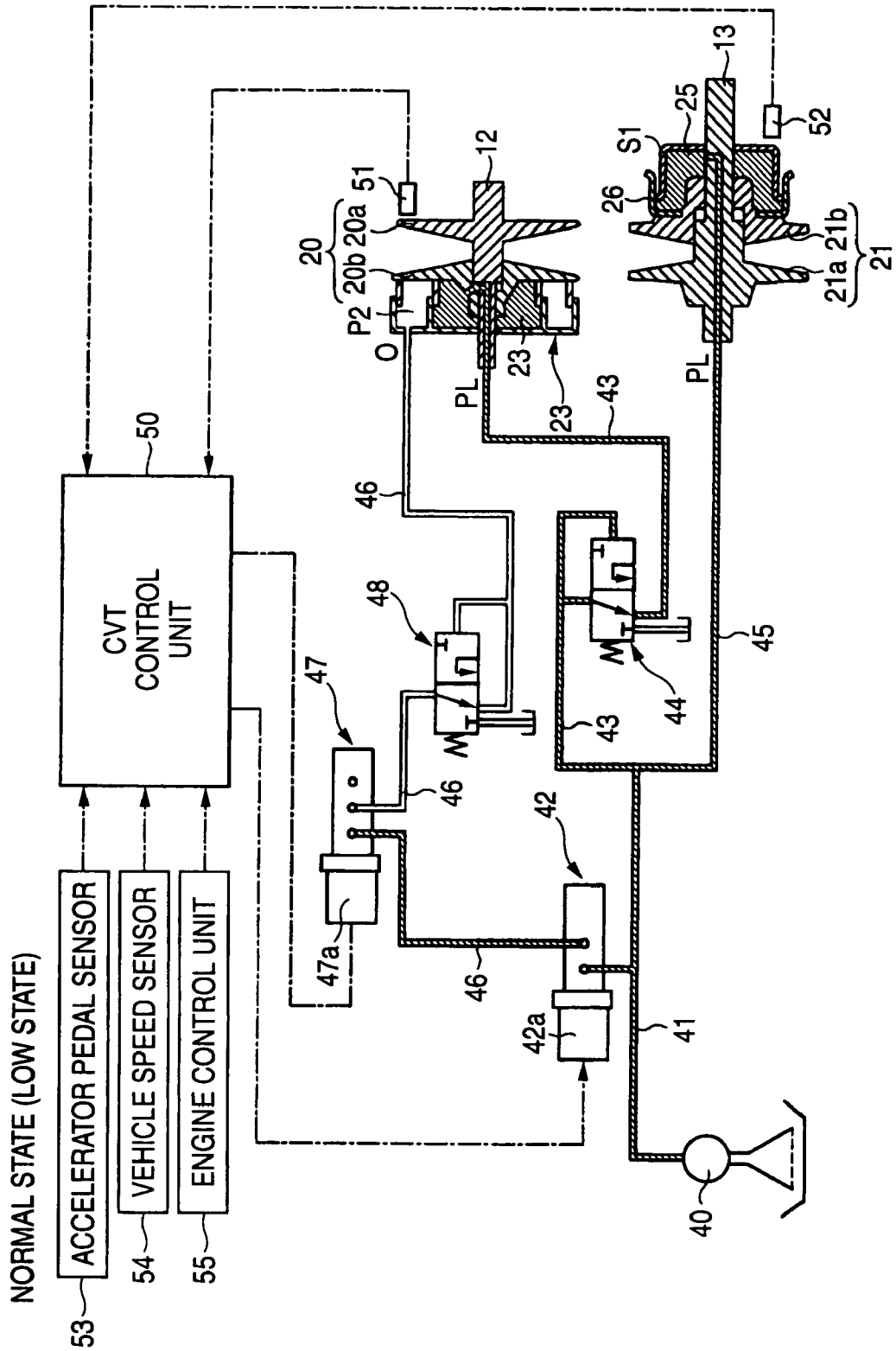
FIG. 5 schematically shows a hydraulic supply state when the speed change ratio is controlled to the low state.
Figure 6:
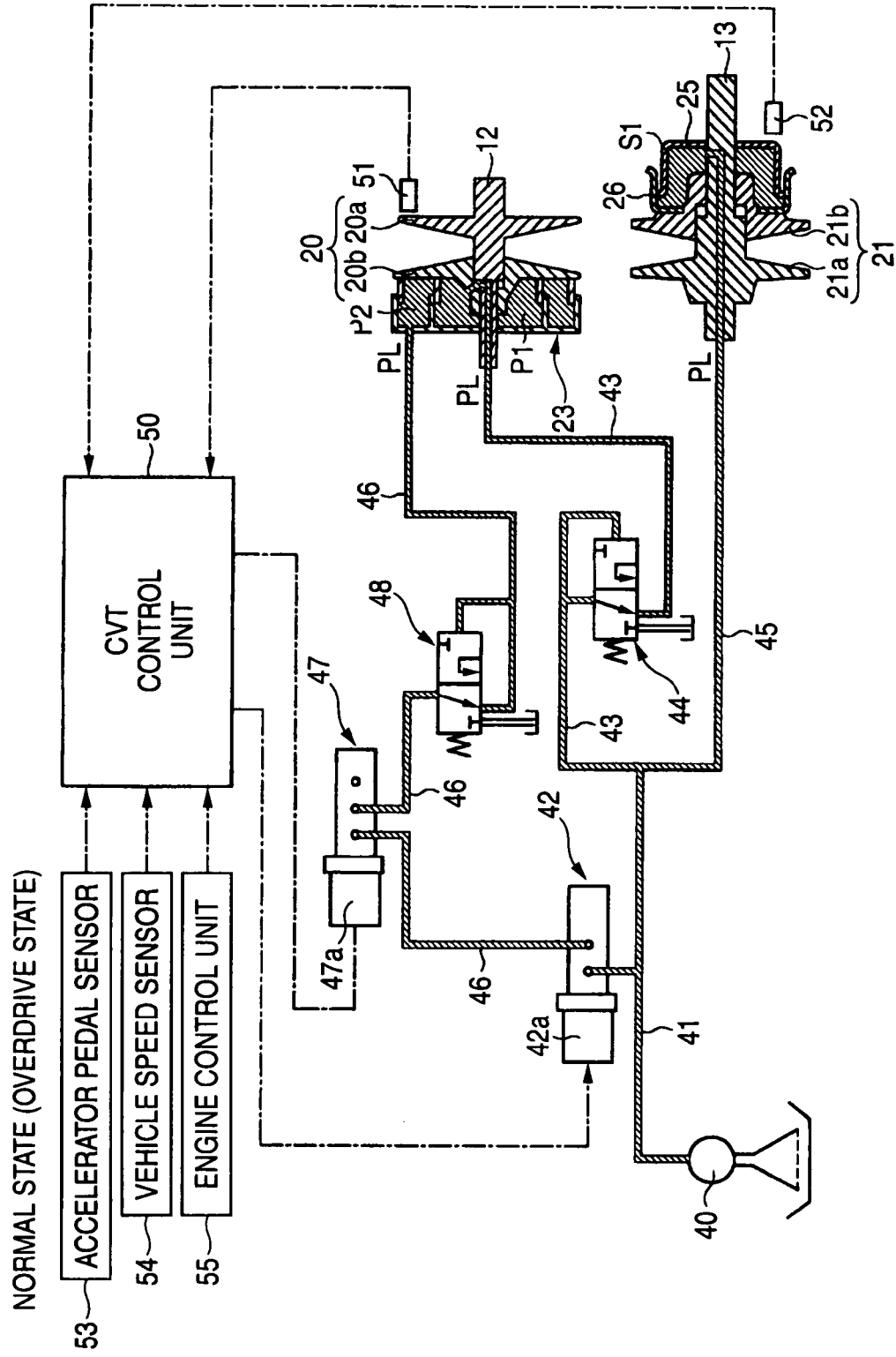
FIG. 6 schematically shows a hydraulic supply state when the speed change ratio is controlled to the overdrive state.

Now, the hydraulic supply state when the speed ratio i is controlled at the maximum value (in the low state) and the minimum value (in the overdrive state) will be described. FIG. 5 schematically shows a hydraulic supply state when the speed ratio i is controlled to the low state, and FIG. 6 schematically shows a hydraulic supply state when the speed ratio i is controlled to the overdrive state. As shown in FIG. 5, when the speed ratio i is controlled to the low state, the primary pressure control valve 47 is switched to an interrupted state, so that the supply of the hydraulic fluid is interrupted. In this way, the primary pressure Pp to be supplied to the hydraulic fluid chamber P2 on the primary side can be lowered to zero, so that the clamp force Fp may be lowered and the clamp force ratio Fr may be lowered. In this way, the speed ratio i can be raised to the low state. Note that the clamp force ratio Fr when the speed ratio i is controlled to the low state can be obtained according to the following Expression (3):

$$Fr=(AP1\times PL)/(AS\times PL)=AP1/AS \quad (3)$$

In this example, the maximum shift speed set depending on the specification of the vehicle is achieved during down-shifting, and therefore the pressure receiving area AP1 on the primary side relative to the pressure receiving area AS on the secondary side is set as follows. The clamp force Fp generated at the primary pulley 20 is calculated in the entire speed ratio range and the entire torque ratio range, and the minimum clamp force Fp is calculated among these clamp forces Fp. Then, a clamp force Fp' necessary for satisfying the maximum shift speed requirement with the minimum clamp force Fp is calculated based on the following Expression (4) according to which the shift speed (di/dt) is obtained, and the clamp force ratio Fr (such as 0.5) obtained by the clamp force Fp' is produced. Note that Fp in Expression (4) is a clamp force necessary for maintaining the speed ratio i at the present and Fp' is a clamp force actually generated at the primary pulley 20 during transmission operation.

$$di/dt=k(i)\times Np\times \Delta Fp=k(i)\times Np\times (Fp-Fp') \quad (4)$$

The calculated clamp force ratio Fr (0.5) is input to the above described Expression (3), so that the relation between the pressure receiving area AP1 and the pressure receiving area AS is set as AP1=0.5 AS. In this way, the pressure receiving area AP1 is set half as large as the pressure receiving area AS, so that the supply of the primary pressure Pp to the hydraulic fluid chamber P2 is interrupted and the clamp force ratio Fr can be lowered to 0.5. As shown in FIG. 4, the minimum clamp force ratio Fr when the speed ratio i equals 2.0 in the low state is near 0.7, and the use of the pulley structure that allows the clamp force ratio Fr to be lowered to 0.5 enables down-shifting to be carried out while the maximum shift speed required in any down-shifting states is satisfied.

Then, as shown in FIG. 6, the speed ratio i is controlled to the overdrive state, the primary pressure control valve 47 is switched to a communication state, so that the hydraulic fluid is directly supplied. In this way, the primary pressure Pp supplied to the hydraulic fluid chamber P2 on the primary side can be raised to the level of the line pressure PL, so that the clamp force Fp and the clamp force ratio Fr can be raised, and the speed ratio i can be lowered to the overdrive state. Note that the clamp force ratio Fr when the speed ratio i is controlled to the overdrive state can be obtained from the following Expression (5):

$$Fr=(AP1\times PL+AP2\times PL)/(AS\times PL)=AP1+AP2/AS \quad (5)$$

In this example, in order to achieve the maximum shift speed set depending on the specification of the vehicle or the like during up-shifting, the pressure receiving areas AP1 and AP2 on the primary side relative to the pressure receiving area AS on the secondary side is set as follows. The clamp force Fp generated at the primary pulley 20 in the entire speed ratio region and the entire torque ratio region is calculated, and the maximum clamp force Fp of the clamp forces Fp is calculated. Then, a clamp force Fp' necessary for satisfying the maximum shift speed requirement at the maximum clamp force Fp is calculated based on the above Expression (4) according to which the shift speed (di/dt) is obtained, and the clamp force ratio Fr (such as 1.9) obtained by the clamp force Fp' is calculated.

Then, the calculated clamp force ratio Fr (1.9) is input to the above Expression (5), so that the relation among the pressure receiving areas AP1 and AP2 and the pressure receiving area AS is set as AP1+AP2=1.9AS. In addition, as described above, since AP1=0.5AS, the relation between the pressure receiving area AP2 and the pressure receiving area AS is set as AP2=1.4AS. In this way, the pressure receiving area AP2 is set 1.4 times as large as the pressure receiving area AS, so that the primary pressure Pp supplied to the hydraulic fluid chamber P2 can be raised to the level of the line pressure PL, and the clamp force ratio Fr can be raised to 1.9. More specifically, as shown in FIG. 4, the maximum clamp force ratio Fr when the speed ratio i=0.45 in the overdrive state is near 1.6, and therefore the use of the pulley structure that allows the clamp force ratio Fr to be raised to 1.9 enables up-shifting while satisfying the maximum shift speed requested in any up-shifting states.

As in the foregoing, the two hydraulic fluid chambers P1 and P2 are formed for the primary pulley 20, and the hydraulic fluid chamber P1 on the primary side and the hydraulic fluid chamber S1 on the secondary side are in communication, so that the flow rate of consumed hydraulic fluid can be lowered. More specifically, the two hydraulic fluid chambers P1 and S1 that supply the hydraulic fluid in different directions depending on the transmission direction are in communication, and therefore the amount of the hydraulic fluid discharged from the hydraulic fluid chambers P1 and S1 during speed shifting can be reduced. In this way, the load on the oil pump 40 can be alleviated, and therefore the combustion performance of the engine 11 can be improved. The pressure receiving areas AP1 and AP2 are set relative to the pressure receiving area AS in consideration of the shift speed during down-shifting and up-shifting, and therefore the shift speed can sufficiently be secured when the amount of hydraulic fluid discharged from the hydraulic fluid chambers P1 and S1 is reduced.

Figure 7:
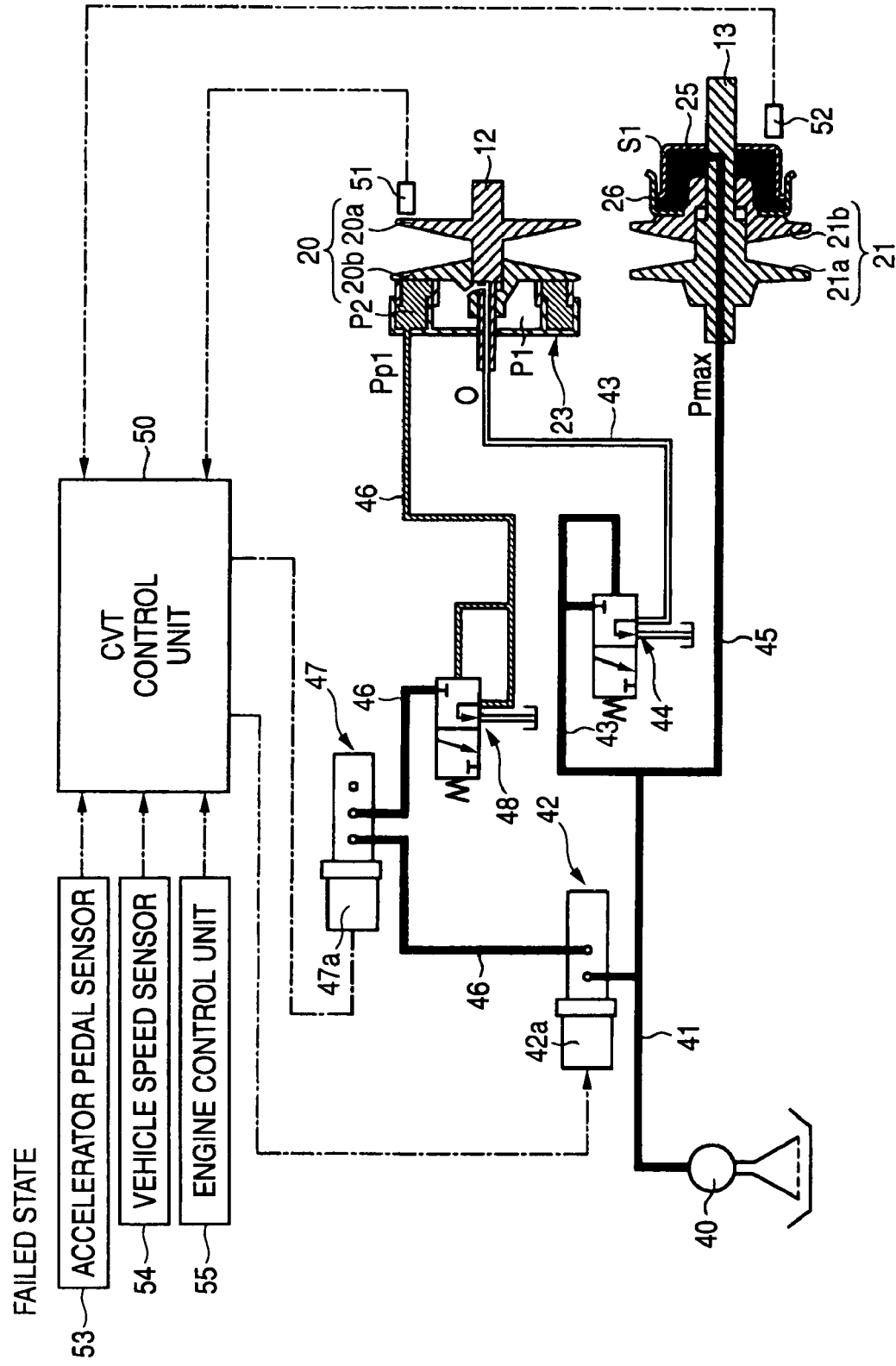
FIG. 7 schematically shows a hydraulic supply state when the line pressure control valve and the primary pressure control valve attain a failed state.

Now, the fail-safe function (limp home function) of the control device according to the invention will be described. FIG. 7 schematically shows the hydraulic supply state when the line pressure control valve 42 and the primary pressure control valve 47 attain a failed state. As shown in FIGS. 2 and 7, a fail-safe valve 44 provided in the second primary pressure path 46 is a pilot selector valve that uses the hydraulic fluid output from the line pressure control valve 42 as a pilot fluid. When the line pressure PL is lower than the upper limit line pressure PLmax as first limit pressure, the valve is switched to the hydraulic supply position in FIG. 2. Meanwhile, when the line pressure PL exceeds the upper line pressure PLmax, the valve is switched to hydraulic discharge position in FIG. 7. In this example, the upper limit line pressure PLmax is the maximum line pressure regulated by the line pressure control valve 42 in a normal state, and the line pressure PL exceeding the upper limit line pressure PLmax is output when the line pressure control valve 42 attains an uncontrollable state.

More specifically, as shown in FIG. 7, when the line pressure control valve 42 attains a failed state, and the line pressure PL exceeds the upper limit line pressure PLmax, the fail-safe valve 44 is switched to the hydraulic discharge position, and therefore the hydraulic fluid is discharged from the hydraulic fluid chamber P1 on the primary side, so that the pressure in the hydraulic fluid chamber P1 is lowered to zero. Note that the fail-safe valve 44 is switched by the upstream hydraulic fluid, so that as long as the line pressure PL exceeds the upper limit line pressure PLmax, the hydraulic fluid continues to be discharged from the hydraulic fluid chamber P1.

As shown in FIGS. 2 and 7, the limiter valve 48 provided in the second primary pressure path 46 is a pilot selector valve that uses the hydraulic fluid output from the limiter valve 48 as a pilot fluid and is switched to the hydraulic supply position in FIG. 2 when the primary pressure Pp is lower than the upper limit primary pressure Ppl as second limit pressure. Meanwhile, the valve is switched to the hydraulic discharge position in FIG. 7 when the primary pressure Pp exceeds the upper limit primary pressure Ppl. In this example, the upper limit primary pressure Ppl is pressure set to be higher than the upper limit line pressure PLmax and supplied to the limiter valve 48 when the line pressure control valve 42 and the primary pressure control valve 47 both attain a failed state.

More specifically, as shown in FIG. 7, when the line pressure control valve 42 and the primary pressure control valve 47 attain a failed state and the primary pressure Pp exceeds the upper limit primary pressure Ppl, the limiter valve 48 is switched to the hydraulic discharge position, so that the primary pressure Pp supplied to the hydraulic fluid chamber P2 may be limited to the upper limit primary pressure Ppl. Note that the limiter valve 48 is switched by the downstream hydraulic fluid. Therefore, when the primary pressure Pp is lower than the upper limit primary pressure Ppl, the valve is switched to the hydraulic supply position. Meanwhile, when the primary pressure Pp exceeds the upper limit primary pressure Ppl, the valve is switched to the hydraulic discharge position, so that the pressure in the hydraulic fluid chamber P2 can be maintained at the level of the upper limit primary pressure Ppl.

Now, a method of setting the upper limit primary pressure Ppl limited by the limiter valve 48 will be described. When the line pressure control valve 42 and the primary pressure control valve 47 attain a failed state, the target speed ratio i in the failed state (upon failure) is preferably set to 1.0 between the low state and the overdrive state in order to secure the driving safety as well as the vehicle performance. In this example, as shown in FIG. 4, the clamp force ratio Fr must be set to 1.0 in order to control the speed ratio i when the torque ratio Tr is zero.

As described above, when the line pressure control valve 42 and the primary pressure control valve 47 attain a failed state, the pressure in the hydraulic fluid chamber P1 is lowered to zero by the operation of the fail-safe valve 44, and the pressure in the hydraulic fluid chamber P2 is maintained at the upper limit primary pressure Ppl by the operation of the limiter valve 48. The maximum discharge pressure Pmax of the oil pump 40 is supplied to the hydraulic fluid chamber S1 on the secondary side. The clamp force ratio Fr at the time is obtained by the following Expression (6), the clamp force ratio Fr must be set to 1.0, and therefore the upper limit primary pressure Ppl is obtained from the following Expression (7):

$$Fr=(AP1 \times 0+AP2 \times Ppl)/AS \times P\max=1.4 \times Ppl/P\max \qquad (6)$$

$$Ppl=0.714 \times P\max \qquad (7)$$

More specifically, the limiter valve 48 is adjusted so that the upper limit primary pressure Ppl is 0.714 times as much as the maximum discharge pressure Pmax, and the hydraulic control circuit can be configured so that when the line pressure control valve 42 and the primary pressure control valve 47 both attain a failed state, the speed ratio i is controlled to be 1.0. In this way, abrupt down-shifting during driving can be prevented and the safety as well as the minimum driving performance can be secured. In addition, the above described fail-safe function can be achieved while the line pressure control valve 42 and the primary pressure control valve 47 serving as flow control valves are incorporated, and therefore the safety in the transmission control during normal driving can be secured as well.

If only the line pressure control valve 42 attains a failed state, the primary pressure control valve 47 is fully opened to control the speed ratio i to be 1.0 as described above. If only the primary pressure control valve 47 attains a failed state, the line pressure PL is raised beyond the upper limit line pressure PLmax by the line pressure control valve 42, so that abrupt down-shifting during driving can be prevented and the safety can be secured. Note that since the values of hydraulic pressure supplied to the hydraulic fluid chambers P2 and S1 are equal in this case, the clamp force ratio Fr is controlled to be 1.4.

It is understood that the invention is not limited to the above described embodiment and may be subjected to various modifications without departing the scope of the invention. For example, in the foregoing description, the two hydraulic fluid chambers P1 and P2 are formed at the primary pulley 20 and one hydraulic fluid chamber S1 is formed at the secondary pulley 21. However, the arrangement is not limited to this and one hydraulic fluid chamber may be formed at the primary pulley 20 and two hydraulic fluid chambers may be formed at the secondary pulley 21. More specifically, the primary pulley 20 may function as a tightening pulley, and the secondary pulley 21 may function as a variable speed pulley.

In consideration of the maximum shift speed during down-shifting, the relation between the pressure receiving areas AP1 and AS is set to the relation represented as AP1=0.5AS, and in consideration of the maximum shift speed during up-shifting, the relation between the pressure receiving areas AP1 and AP2 and the pressure receiving area AS is set to the relation represented as AP1+AP2=1.9AS, while the values are not limited to these numerical values and may be changed as required.

Furthermore, the upper limit primary pressure Ppl of the limiter valve 48 is set so that the speed ratio i is controlled to be 1.0 when the line pressure control valve 42 and the primary pressure control valve 47 both attain a failed state. The arrangement is not limited to this, and the upper limit primary pressure Ppl may be changed so that the speed ratio i is controlled to a different target speed ratio.

Instead of the driving belt 22 used as the power transmission element in this example, a driving chain may be used as the power transmission element. The line pressure control valve 42 and the primary pressure control valve 47 are flow control valves that uniquely control the flow rate of the hydraulic fluid to control the line pressure PL or the primary

What is claimed is:

1. A control device for a continuously variable transmission having a variable speed pulley including first and second variable speed pressure chambers that control the groove width of the pulley, a tightening pulley including a tightening pressure chamber that controls the groove width of the pulley, and a power transmission element wound around the variable speed pulley and the tightening pulley, the control device comprising:
   a line pressure control valve provided between a hydraulic pressure supply source and the tightening pulley to regulate hydraulic fluid supplied from the hydraulic pressure supply source to have a pressure of a line pressure, the hydraulic fluid being supplied to the first variable speed pressure chamber and the tightening pressure chamber;
   a speed ratio control valve provided between the line pressure control valve and the variable speed pulley to regulate hydraulic fluid supplied from the line pressure control valve to have a pressure of variable speed control pressure, the hydraulic fluid being supplied to the second variable speed pressure chamber;
   a first reducing valve provided between the line pressure control valve and the variable speed pulley, the first reducing valve passing the hydraulic fluid regulated by the line pressure control valve toward the variable speed pulley and, when the line pressure exceeds a first limit pressure, reducing the pressure of the hydraulic fluid and supplying the hydraulic fluid with the reduced pressure to the variable speed pulley; and
   a second reducing valve provided between the speed ratio control valve and the variable speed pulley, the second reducing valve passing the hydraulic fluid regulated by the speed ratio control valve toward the variable speed pulley and, when the variable speed control pressure exceeds a second limit pressure, reducing the pressure of the hydraulic fluid and supplying the hydraulic fluid with the reduced pressure to the variable speed pulley.

2. The control device for a continuously variable transmission according to claim 1, wherein the first reducing valve is provided between the line pressure control valve and the first variable speed pressure chamber to reduce the line pressure supplied to the first variable speed pressure chamber.

3. The control device for a continuously variable transmission according to claim 2, wherein the size of the first variable speed pressure chamber relative to the tightening pressure chamber is set based on a shift speed requested upon down-shifting.

4. The control device for a continuously variable transmission according to claim 2, wherein the sizes of the first and second variable speed pressure chambers relative to the tightening pressure chamber are set based on a shift speed requested upon up-shifting.

5. The control device for a continuously variable transmission according to claim 2, wherein the first limit pressure is the maximum line pressure regulated by the line pressure control valve.

6. The control device for a continuously variable transmission according to claim 2, wherein the line pressure control valve and the speed ratio control valve set the second limit pressure based on a target speed ratio when the line pressure control valve and the speed ratio control valve fail.

7. The control device for a continuously variable transmission according to claim 2, wherein the second reducing valve is provided between the speed ratio control valve and the second variable speed pressure chamber and reduces the variable speed control pressure supplied to the second variable speed pressure chamber.

8. The control device for a continuously variable transmission according to claim 1, wherein the second reducing valve is provided between the speed ratio control valve and the second variable speed pressure chamber and reduces the variable speed control pressure supplied to the second variable speed pressure chamber.

9. The control device for a continuously variable transmission according to claim 8, wherein the size of the first variable speed pressure chamber relative to the tightening pressure chamber is set based on a shift speed requested upon down-shifting.

10. The control device for a continuously variable transmission according to claim 8, wherein the sizes of the first and second variable speed pressure chambers relative to the tightening pressure chamber are set based on a shift speed requested upon up-shifting.

11. The control device for a continuously variable transmission according to claim 8, wherein the first limit pressure is the maximum line pressure regulated by the line pressure control valve.

12. The control device for a continuously variable transmission according to claim 8, wherein the line pressure control valve and the speed ratio control valve set the second limit pressure based on a target speed ratio when the line pressure control valve and the speed ratio control valve fail.

13. The control device for a continuously variable transmission according to claim 1, wherein the size of the first variable speed pressure chamber relative to the tightening pressure chamber is set based on a shift speed requested upon down-shifting.

14. The control device for a continuously variable transmission according to claim 13, wherein the sizes of the first and second variable speed pressure chambers relative to the tightening pressure chamber are set based on a shift speed requested upon up-shifting.

15. The control device for a continuously variable transmission according to claim 13, wherein the first limit pressure is the maximum line pressure regulated by the line pressure control valve.

16. The control device for a continuously variable transmission according to claim 13, wherein the line pressure control valve and the speed ratio control valve set the second limit pressure based on a target speed ratio when the line pressure control valve and the speed ratio control valve fail.

17. The control device for a continuously variable transmission according to claim 1, wherein the sizes of the first and second variable speed pressure chambers relative to the tightening pressure chamber are set based on a shift speed requested upon up-shifting.

18. The control device for a continuously variable transmission according to claim 17, wherein the first limit pressure is the maximum line pressure regulated by the line pressure control valve.

19. The control device for a continuously variable transmission according to claim 17, wherein the line pressure control valve and the speed ratio control valve set the second limit pressure based on a target speed ratio when the line pressure control valve and the speed ratio control valve fail.

20. The control device for a continuously variable transmission according to claim 1, wherein the first limit pressure is the maximum line pressure regulated by the line pressure control valve.

21. The control device for a continuously variable transmission according to claim 20, wherein the line pressure control valve and the speed ratio control valve set the second limit pressure based on a target speed ratio when the line pressure control valve and the speed ratio control valve fail.

22. The control device for a continuously variable transmission according to claim 1, wherein the line pressure control valve and the speed ratio control valve set the second limit pressure based on a target speed ratio when the line pressure control valve and the speed ratio control valve fail.

23. The control device for a continuously variable transmission according to claim 1, wherein said line pressure control valve and said speed ratio control valve are arranged such that the line pressure (PL) supplied to the first variable speed pressure chamber and the variable speed control pressure (Pp) supplied to the second variable speed pressure chamber are received on a common primary side of the variable speed pulley as to generate common direction force components which, when summed, represent variable speed pulley clamp force Fp that is based on the equation $Fp = AP1 \times PL + AP2 \times Pp$, with AP1 representing the area of the first variable speed pressure chamber and with AP2 representing the area of the second variable speed pressure chamber.

* * * * *